United States Patent Office 2,975,134
Patented Mar. 14, 1961

2,975,134

ANTIWEAR LUBRICANTS CONTAINING BORON ESTERS

James F. Cook, Garden Grove, Calif., assignor to Union Oil Company of California, Los Angeles, Calif., a corporation of California No Drawing. Filed Feb. 24, 1956, Ser. No. 567,464

10 Claims. (Cl. 252—40.7)

This invention relates to lubricants having extreme pressure and antiwear characteristics. It relates also to boron compounds of the ester type which when added to lubricating oils or greases impart mild extreme pressure (E.P.) characteristics and greatly reduces the wear resulting when such lubricants are used in lubricating moving metal parts.

It is found that certain oil-soluble boron derivatives prepared as described herein, when added to lubricating oils or greases not only improve the ability of the lubricant to prevent seizure of the parts being lubricated but in addition greatly reduce the amount of wear on such moving parts. The boron derivatives are those obtained by reacting, under dehydrating conditions, equimolar quantities of boric acid and certain dihydroxy organic compounds. In this reaction equivalent amounts of $B_2O_3$ may be substituted for the boric acid. The reaction products so obtained are made even more effective by further reaction of one mol of the initial reaction product with one mol of a monohydroxy organic compound.

It is an object of this invention to provide oil-soluble boron-containing compounds of the types described herein which are compatible with, and relatively stable in, a variety of petroleum base lubricants.

It is another object of this invention to provide lubricating oils and greases containing the oil-soluble boron compounds described herein which lubricants possess E.P. and antiwear characteristics.

A further object of this invention is to provide a method of producing the mentioned oil-soluble boron derivatives and lubricants containing such derivatives.

It is found that by reacting, under dehydrating conditions, a particular class of dihydroxy organic compounds with boric acid or boron oxide using one-half mol of boron oxide or one mol of boric acid per mol of dihydroxy compound, there is produced an oil-soluble boron compound which when added to lubricating oils or greases has the effects above described. The effectiveness of the boron compound in imparting E.P. and antiwear characteristics to a lubricant is improved if the initial reaction product described is further reacted, under dehydrating conditions, with a monohydroxy organic compound such as a monohydroxy alcohol or a phenol in the ratio of one mol of the initial reaction product per mol of monohydroxy compound. As used herein the term boric acid is used in its usual sense to mean the compound $H_3BO_3$ and boron oxide is $B_2O_3$ which is also called boric anhydride.

The initial reaction between the boric acid or boron oxide and the dihydroxy compound takes place readily under dehydrating conditions, thus the reaction occurs in the presence of dehydrating agents as for example concentrated sulfuric acid, concentrated phosphoric acid, $P_2O_5$, or the like. By concentrated is meant 40% to 100% or more, e.g., fuming acid. The reaction also takes place readily by refluxing the mixture of reactants with an entraining agent boiling at a temperature between about 180° F. and about 400° F., using a water trap in the reflux line. Entraining agents which are suitable include naphtha, benzene, toluene, chlorinated solvents, such as ethylene dichloride. In still another method, the reaction may be effected by carrying it out at reduced pressures sufficient to remove water produced in the reaction at the temperature at which the reaction takes place. Apparently catalysts are not essential.

Dihydroxy organic compounds which may be used in the above reaction include those dihydroxy compounds in which the hydroxyl groups are attached to carbon atoms separated by at least one carbon atom and not more than two carbon atoms. Preferably, the two hydroxyl groups are attached to carbon atoms separated by one carbon atom. Dihydroxy alcohols which may be employed may be alkyl, cyclo-alkyl, or aryl alcohols. Preferably open chain alkyl dihydroxy alcohols are employed. In order to obtain boron derivatives which are oil-soluble, it is essential that the dihydroxy alcohol contain at least 6 carbon atoms per molecule, and it is found that alcohols having greater than about 30 carbon atoms per molecule do not give boron derivatives having the ability to impart antiwear characteristics to lubricants to the desired extent. Preferably, the carbon atom content of the dihydroxy alcohols will be between 6 and about 18. Those alcohols having from 6 to 10 carbon atoms per molecule are particularly preferred in that the boron derivatives of this group of alcohols appear to have the greatest ability to impart E.P. and antiwear characteristics to lubricants. In addition to the alcohols described the dihydroxy aromatic compounds represented by resorcinol and the various hydrocarbon substituted resorcinols may be employed. The carbon atom content limitations for the dihydroxy alcohols applies as well to the dihydroxy aromatic compounds.

Typical dihydroxy alcohols which may be used in the first reaction described to produce the oil-soluble boron derivative include 2,2-diethyl propanediol-1,3, 2,3-dimethyl butanediol-2,3, 2-methyl pentanediol-1,3, 2-methyl pentanediol-2,4, 2-ethylhexanediol-1,3, 2-ethyl-2-butyl propanediol-1,3, 2-ethyl-2-butyl butanediol-1,3, 4-ethyl decanediol-2,4, octadecanediol-1,3, 2-cyclohexyl propanediol-1,3, 2-benzyl propanediol-1,3. Typical dihydroxy aromatic compounds which may be used in addition to resorcinol include 4-butyl resorcinol, 2,4-dimethyl resorcinol, 2,5-dimethyl resorcinol, 4-isoamyl resorcinol and the like.

The initial product obtained by reacting boric acid or boron oxide with the dihydroxy compound, although having the desirable properties described hereinabove, is improved with respect to its ability to impart E.P. and antiwear characteristics to lubricants by further reaction with a monohydroxy organic compound having from 1 to about 26 carbon atoms per molecule. The monohydroxy compound may be an alkyl, cycloalkyl, or aryl alcohol, or it may be a phenol or alkyl-substituted phenol. The aliphatic alcohols having from 1 to 20 carbon atoms per molecule are the preferred monohydroxy organic compounds. Thus methyl, ethyl, propyl, butyl, pentyl, hexyl, octyl, lauryl and stearyl alcohols are representative of the alcohols which may be used. Additionally, however, cyclohexyl, cyclopentyl and the various alkyl-substituted cyclohexyl and cyclopentyl alcohols may be employed. Moreover, phenol and the various alkyl-substituted phenols such as cresols and higher homologs may be employed. Alcohols such as furfuryl and tertahydro furfuryl alcohols are also useful in preparing the final ester compound.

The structure of the boron derivatives obtained, as described above, is not definitely known. It is believed, however, that when one mol of a dihydroxy compound of the type described is reacted with one mol of boric acid, the product is a boron ester, in which one free —OH group remains attached to the boron atom. The esterification takes place with the hydroxyl groups of the dihydroxy compound is indicated by the fact that approximately 2 mols of water are released in this initial reaction. It it believed that a similar result is obtained when $B_2O_3$ is employed in place of the boric acid, since the products appear to have the same characteristics. In this case 1 mol of water is liberated per mol of dihydroxy compound. Since the reaction products cannot be defined by formula, they will be described herein as reaction products obtained by reacting one mol of dihydroxy alcohol with one mol of boric acid or one-half mole of $B_2O_3$ under dehydrating conditions. In order to distinguish the initial reaction product from the reaction product obtained by further esterification of the initial reaction product with a monohydroxy organic compound, the first product will be referred to as the boron partial ester and the second as the boron ester or boron triester.

Since the chemical structure of the above described partial ester is not known, it is obvious that the structure of the further reaction product with a monohydroxy organic compound cannot be set forth. It will be referred to as the product obtained by reacting one mol of the partial ester with one mol of a monohydroxy organic compound under dehydrating conditions.

Conditions under which this latter reaction take place are similar to those described for obtaining the partial ester and involve dehydration with a dehydrating agent such as concentrated sulfuric acid, concentrated phosphoric acid, $P_2O_5$ and the like, under vacuum to remove water formed during the reaction or by refluxing with a solvent such as described hereinabove which acts as an entraining agent for water produced during the reaction.

One method of preparing the intermediate product or partial ester involves the reaction of one-half mol of $B_2O_3$ with one mol of dihydroxy compound, as for example 2-ethyl hexanediol-1,3, in an ice bath at 32–35° F. using sulfuric acid as the dehydrating agent. The reactants are stirred and brought to a temperature of about 35° F. and sulfuric acid of approximately 95% concentration is slowly added to the cooled mixture. The amount of acid to be added may vary from 0.1 to 3 volumes of acid per volume of reactants. Typically, about one volume of the acid is employed. Following the addition of sulfuric acid the reaction mixture is stirred for 20–30 minutes and then allowed to stratify. The upper layer is separated from the lower aqueous layer, consisting primarily of sulfuric acid which is discarded. The reaction product is dissolved in a solvent, as for example toluene, and preferably filtered through clay to remove traces of acid. The toluene solution is partially evaporated and the desired product crystallizes as the concentrated toluene solution is permitted to cool, the crystals being separated by filtration. Boric acid may be substituted for the $B_2O_3$, however in this case one mol of boric acid will be used per mol of polyhydroxy alcohol. Moreover, concentrated phosphoric acid or $P_2O_5$ may be used in place of the sulfuric acid.

Another method of preparing the initial reaction product or partial ester involves refluxing a mixture of one mol of boric acid or one-half mol $B_2O_3$ with one mol of dihydroxy compound, as for example 2-ethyl hexanediol-1,3, in the presence of a solvent such as naphtha or toluene. Approximately 1–4 volumes of solvent per volume of reactants will be employed. Refluxing is continued with a water trap in the reflux line until the production of water ceases. Generally this reaction will be complete in 1 to 4 or 5 hours, depending upon the reactants, and upon the reflux temperature, i.e. upon the boiling point of the solvent which is employed. When the reaction is complete, the reaction mixture may be cooled to cause the partial ester to crystallize and it is separated from the cooled mixture by filtration. In the event the solubility of the reaction product in the solvent employed warrants it, distillation without reflux will be used to remove part or all of the solvent to recover the reaction product.

Following the preparation by either method of the intermediate or partial ester, the product may be fractionally distilled at ordinary or preferably at reduced pressures to obtain a purified partial ester.

Still a third method of preparing the partial ester is to heat a mixture of boron oxide or boric acid with a dihydroxy compound in the proportion indicated hereinabove to a temperature as high as 180°–212° F. at reduced pressures, e.g. 10–20 mm. of mercury. Such heating results in the formation of the partial ester without further treatment. Heating for periods of 1 to 2 or 3 hours suffices. The resulting product may be purified by crystallizing it from a solvent such as toluene as described above and/or by fractional distillation. The partial ester boils at temperatures below the boiling point of the alcohol and is thus readily separated from unreacted alcohol when present.

This intermediate reaction product or partial ester is readily converted to the finished ester or triester, as it has been defined hereinabove, using ordinary conditions of esterification. Any of the conditions described above for preparing the partial ester may be employed. However, in this case, refluxing a mixture of one mol of partial ester with one mol of monohydroxy organic compound dissolved in naphtha or toluene with a water trap in the reflux line is a very effective method of producing the triester. Catalysts are not needed in this reaction. The reaction is complete when the production of water ceases. Approximately one mol of water is produced in the reaction. Following completion of the esterification reaction the toluene or other solvent and excess alcohol may be removed by fractional distillation.

In some instances it is found that by reacting a mixture of 1 mol of boric acid, 1 mol of dihydroxy organic compound and 1 mol of monohydroxy compound the reaction product appears to be equivalent to a corresponding compound prepared by the two step process described above. If this method of preparation is used it is preferable to use the method involving refluxing with a solvent to effect dehydration.

The partial ester or the triester produced as described hereinabove may be added to and incorporated in lubricating oils and in greases. In the case of oils it is merely necessary to dissolve the ester in the oil. In the case of greases, the esters may be first added to all or a portion of the oil employed in preparing the greases, or it may be incorporated in the finished grease by agitation in a grease kettle or other mixing device until it is well dispersed in the grease. Whether used in oils or in greases, between about 1% and about 10% of the boron compound will be added and preferably between about 2% and about 8% by weight of the boron compound will be used. It is found that 5% by weight of the boron compound provides optimum antiwear and E.P. characteristics.

Oils which are improved by the incorporation of the boron compounds of this invention include substantially all lubricating oils, whether or not other additive materials are present. The oils may be of the naphthenic or paraffinic types. Thus the effectiveness of the boron partial esters and the triesters is observed when added to lubricating oils containing detergent additives, e.g., sulfonates, anticorrosion agents, e.g., metal thiophosphates, and the like. In the case of greases substantially any metal soap grease is improved with respect to antiwear characteristics and those greases which do not have E.P. characteristics are improved in this respect by the incorporation of the amounts of boron compounds described above.

The following examples will serve to illustrate the invention.

EXAMPLE I

To 400 grams of 2-methyl-pentanediol-2,4 is added 210 grams of boric acid and 100 ml. of water. This mixture is stirred and cooled in an ice bath and approximately 100 grams of 98% sulfuric acid is added dropwise with stirring. Following addition of the sulfuric acid the mixture is stirred for an additional 10 minutes and permitted to separate. The resulting upper oil-soluble phase is removed and the lower aqueous phase discarded. Upon standing, the upper phase crystallizes and is further purified by recrystallizing from a low boiling naphtha. This product is the partial ester, and will be referred to herein as Product A, Example I.

A grease is prepared by incorporating approximately 5% by weight of the above Product A in a commercial sodium soap grease containing approximately 8% by weight of sodium soap in lubricating oil. The texture of the grease is not observed to be modified appreciably by the incorporation of this partial ester.

To 180 grams of the above Product A are added 90 grams of amyl alcohol dissolved in approximately 2 volumes of toluene. The resulting mixture is refluxed at a temperature of about 230° F. for a period of 2 hours with a water trap in the reflux line. At this time no further water is being collected. The reaction mixture is then distilled to remove excess amyl alcohol and the toluene. This product will be referred to herein as Product B, Example I.

A grease is prepared by heating 10 grams of a lithium stearate, 5 grams of the above product, and 85 grams of a 100 SSU at 100° F. acid treated naphthenic oil of 25 viscosity index to 300° F. with stirring. The resulting mixture is allowed to cool whereupon a stable unctuous grease is obtained.

For purposes of comparison a lithium grease is prepared using 10% by weight of lithium stearate in the above naphthenic oil. The method of preparation is the same as that described for the ester-modified grease.

EXAMPLE II

A mixture of 118 grams of 2-methyl-pentanediol-2,4, 62 grams of boric acid, 100 ml. of water, and 100 ml. of methyl alcohol is heated until a uniform solution is obtained. To this mixture, at a temperature of 70° F. is added dropwise approximately 60 grams of 98% sulfuric acid with continual stirring. After the acid is added stirring is continued for 10 minutes. The mixture is allowed to stand and stratify and the upper oily layer is separated, the lower aqueous phase being discarded. On standing the oily layer crystallizes. The product is recrystallized from a naphtha whose boiling range is 160°–230° F.

A grease is prepared by heating to a temperature of 380° F., 10 grams of lithium stearate, 10 grams of the above crystalline product, and 80 grams of a California acid-treated naphthenic lubricating oil of 25 V.I. having an S.U. viscosity of 200 seconds at 100° F. The resulting melt is cooled to room temperature with agitation and there is obtained a stable unctuous grease.

EXAMPLE III

A mixture of 350 grams of $B_2O_3$ and 1180 grams of 2-methyl pentanediol-2,4, and approximately 2 volumes of ethylene dichloride is refluxed at about 1850° F. with a water trap in the reflux line for about 2 hours, at which time no more water is being recovered. At this time the solvent is removed by distillation and on cooling the product crystallizes to a solid mass. The mass is recrystallized from toluene. This partial ester will be referred to herein as Product A, Example III.

A lithium grease is prepared from this product as described in Example II.

A mixture of 150 grams of the above Product A of this example and 212 grams of lauryl alcohol with 100 ml. of toluene is refluxed with a water trap in the reflux line for a period of 2 hours, at which time the production of water ceases. The toluene is then distilled leaving as a residue the triester which will be referred to herein as Product B, Example III.

Two separate portions of a commercial sodium base grease, as described in Example I are modified by the addition of 2% and 5% respectively of the above Compound B. The resulting greases have physical characteristics substantially identical with the original sodium base grease.

EXAMPLE IV

A mixture of 62 grams of boric acid, 147 grams of 2-ethyl hexanediol-1,3, and 100 ml. of a naphtha boiling in the range of 160° F. to 230° F. are refluxed with a water trap in the reflux line for about 2 hours at which time no more water is being recovered. At this time 160 grams of decanol are added and refluxing continued until no further water is being recovered. The naphtha and excess decanol are removed by distillation. The resulting triester product is a clear mobile oily liquid. This product remains a mobile liquid to −60° F.

A commercial barium base grease containing approximately 12.5% barium soap is modified by working 5% of the above product into it in a manner usually used in grease manufacture. A stable, slightly more transparent grease is obtained. A second portion of barium base grease is modified by working into the grease 1% by weight of the above triester product.

EXAMPLE V

A mixture of 119 grams hexanediol and 62 grams of boric acid are heated together under a slight vacuum with a water trap in the vacuum line for about 2 hours at which time complete solution is accomplished and no more water is being recovered. At this time 100 grams of cyclohexanol are added and heating is continued under a slight vacuum for about 2 hours at which time no further water is being obtained. The triester product is a mobile liquid which remains fluid to −60° F.

A barium base as described in Example IV is modified with 10% by weight of the above triester product. This grease is slightly softer than the original barium base grease but appears to have the same texture.

EXAMPLE VI

A mixture of 146 grams of 2-ethyl-hexanediol-1,3, 62 grams of boric acid, and 200 ml. of toluene are refluxed with a water trap in the line for 1 hour at which time no further water is being recovered. At this time 103 grams of tetrahydrofurfuryl alcohol are added and refluxing continued for about 1 hour at which time no further water is being recovered. The toluene was removed by distillation. A clear mobile liquid is obtained which remains fluid at −60° F.

A barium base grease containing approximately 12.5% barium soap is modified by working 5% of the above product into it in the manner normally used in grease manufacture. A stable slightly translucent grease is obtained.

EXAMPLE VII

A mixture of 146 grams of 2-ethyl hexanediol-1,3, 62 grams of boric acid and 100 ml. of toluene are refluxed with a water trap in the reflux line for about 2 hours at which time no further water is being recovered. A portion of the product in toluene solution is removed and separately handled to recover the partial ester. This is accomplished by evaporating toluene leaving the partial ester as residue. This material will be referred to as Product A, Example VII. A portion of this product is incorporated in a commercial sodium grease as described in Example I to give a grease containing 2% by weight of Product A.

The remainder of the toluene solution above described is further refluxed after adding 1 mol of cetyl alcohol per mol of partial ester. Following completion of the reaction the toluene solution is cooled and the triester product separates as well defined crystals which are removed by filtration. This material will be referred to as Product B, Example VII.

A grease is prepared by heating 10 grams of lithium stearate, 2 grams of Product B of this example and 88 grams of a 100 SSU at 100° F. acid treated coastal naphthenic lubricating oil to 360° F. at which point a clear solution is obtained. This is allowed to cool at which time a smooth stable grease is obtained.

EXAMPLE VIII

A mixture of 62 grams of boric acid, 98 grams of resorcinol and 200 ml. of benzene are refluxed with a water trap in the reflux line for about 3 hours at which time no more water is being recovered. At this time 95 grams of phenol are added and refluxing continued for about 1 hour. The benzene was removed by distillation.

A lithium grease is prepared in the same manner as described in Example VII in which 2% of the above triester is incorporated.

EXAMPLE IX

A mixture of 35 grams $B_2O_3$, 98 grams of resorcinol, and 100 ml. of toluene are refluxed with a water trap in the reflux line for about 2 hours at which time no further water is being recovered. One-half of the product is removed and the toluene evaporated leaving the partial ester as a residue. This product will be referred to as Product A, Example IX.

To the remainder of the original reaction mixture is added 50 grams of cyclohexanol and refluxing continued for an additional hour. The toluene is evaporated from this product leaving the triester as a residue. This product will be referred to as Product B, Example IX.

Following the method outlined in Example VII lithium greases are prepared containing 5% of Product A and Product B, respectively.

To test the E.P. and wear characteristics of oils and greases containing the products of this invention use was made of the Falex tester made by the Faville-Levally Corporation. This test machine has been used in the oil and related industries for more than about 20 years as a means of evaluating lubricants. Steel pins were run against steel blocks in the tests carried out and described herein and wear was determined by the number of notches the loading wheel had to be advanced in order to maintain a constant load on the jaws which compress the steel blocks against a rotating steel pin. Tests were run at jaw pressures of 100 pounds and 500 pounds, respectively. At 100 pounds' load the unmodified oils and greases tested showed appreciable wear but did not permit seizure of the test pieces whereas the oils and greases containing boron derivatives showed little or no wear. At 500 pounds' load the unmodified oils and greases seized after 2 to 10 minutes whereas the modified lubricants did not permit seizure in any instance. The amount of wear at a jaw loading of 500 pounds with the modified lubricants was consistently far less than the wear observed at 100 pounds with the unmodified lubricants.

The results of Falex tests on greases and lubricating oils with and without the boron derivatives of this invention are shown in Tables I and II below. The compositions of Table I are those in which the additive is the product of reaction of 1 mol of boric acid or one-half mol of $B_2O_3$ with one mol of a dihydroxy compound. The compositions of Table II are those in which the additive is the triester obtained by reacting 1 mol of the intermediate product or partial ester with 1 mol of a monohydroxy organic compound.

The lubricating oil used in preparing the lube oil blends referred to in the tables is a naphthenic SAE 20 lubricating oil of about 25 V.I. The blends are prepared by dissolving the disclosed amount of additive in the oil at ordinary temperatures. It is to be pointed out that the effectiveness of the various additives is substantially the same whether in naphthenic or paraffinic lubricating oils.

TABLE I

*Falex test results*

PARTIAL ESTERS

| Base Lubricant | Additive | | Jaw Load, lbs. | Time, Min. | Wear, Notches |
|---|---|---|---|---|---|
| | Percent (Wt.) | Description | | | |
| Na grease a | | | 100 | 120 | 50 |
| Do.a | 5 | Prod. A, Ex. I | 100 | 120 | 2 |
| Do.a | 2 | Prod. A, Ex. VII | 100 | 120 | 4 |
| Do.a | | | 500 | 2 | Seized |
| Do.a | 5 | Prod. A, Ex. I | 500 | 135 | 6 |
| Do.a | 2 | Prod. A, Ex. VII | 500 | 135 | 7 |
| Li grease b | | | 100 | 120 | 48 |
| Do.b | 5 | Prod. A, Ex. III | 100 | 120 | 2 |
| Do.b | 5 | Prod. A, Ex. IX | 100 | 120 | 1 |
| Do.b | | | 500 | 2 | Seized |
| Do.b | 5 | Prod. A, Ex. III | 500 | 135 | 6 |
| Do.b | 5 | Prod. A, Ex. IX | 500 | 135 | 5 |
| Lube oil c | | | 100 | 120 | 40 |
| Do.c | 2 | Prod. A, Ex. I | 100 | 120 | 2 |
| Do.c | 5 | Prod. A, Ex. I | 100 | 120 | 0 |
| Do.c | | | 500 | 3 | Seized |
| Do.c | 2 | Prod. A, Ex. I | 500 | 90 | 22 |
| Do.c | 5 | Prod. A, Ex. I | 500 | 120 | 1 | a A commercial sodium grease containing approximately 10% of sodium soap.
b A lithium grease containing approximately 10% by weight of lithium stearate.
c A naphthenic SAE 20 lubricating oil of about 25 V.I.

TABLE II

*Falex test results*

TRIESTERS

| Base Lubricant | Additive | | Jaw Load, Pounds | Time, Min. | Wear, Notches |
|---|---|---|---|---|---|
| | Percent (Wt.) | Description | | | |
| Na grease a | | | 100 | 120 | 50 |
| Do.a | 2 | Prod. B, Ex. III | 100 | 120 | 0 |
| Do.a | 5 | Prod. B, Ex. III | 100 | 120 | 2 |
| Do.a | | | 500 | 2 | Seized |
| Do.a | 2 | Prod. B, Ex. III | 500 | 120 | 6 |
| Do.a | 5 | Prod. B, Ex. III | 500 | 120 | 8 |
| Li grease b | | | 100 | 120 | 48 |
| Do.b | 5 | Prod. B, Ex. I | 100 | 120 | 2 |
| Do.b | 10 | Prod. B, Ex. II | 100 | 120 | 1 |
| Do.b | 2 | Prod. B, Ex. VII | 100 | 120 | 4 |
| Do.b | | | 500 | 2 | Seized |
| Do.b | 5 | Prod. B, Ex. I | 500 | 120 | 6 |
| Do.b | 10 | Prod. B, Ex. II | 500 | 120 | 5 |
| Do.b | 2 | Prod. B, Ex. VII | 500 | 60 | 27 |
| Do.b | 2 | Prod. B, Ex. VIII | 500 | 60 | 30 |
| Do.b | 5 | Prod. B, Ex. IX | 500 | 60 | 16 |
| Ba grease c | | | 100 | 120 | 50 |
| Do.c | 5 | Example IV | 100 | 120 | 1 |
| Do.c | 2 | Example IV | 100 | 120 | 2 |
| Do.c | 10 | Example V | 100 | 120 | 1 |
| Do.c | | | 500 | 10 | Seized |
| Do.c | 5 | Example IV | 500 | 120 | 6 |
| Do.c | 1 | Example IV | 500 | 120 | 8 |
| Do.c | 10 | Example V | 500 | 120 | 5 |
| Do.c | 5 | Example VI | 500 | 120 | 8 |
| Lube oil d | | | 100 | 120 | 30 |
| Do.d | 5 | Prod. B, Ex. III | 100 | 120 | 0 |
| Do.d | 2 | Prod. B, Ex. VII | 100 | 120 | 2 |
| Do.d | 5 | Prod. B, Ex. VIII | 100 | 120 | 1 |
| Do.d | 10 | Prod. B, Ex. IX | 100 | 120 | 1 |
| Do.d | | | 500 | 3 | Seized |
| Do.d | 5 | Prod. B, Ex. I | 500 | 120 | 6 |
| Do.d | 8 | Prod. B, Ex. II | 500 | 120 | 4 |
| Do.d | 2 | Prod. B, Ex. III | 500 | 120 | 8 |
| Do.d | 5 | Example IV | 500 | 120 | 7 |
| Do.d | 5 | Example V | 500 | 120 | 7 |
| Do.d | 5 | Prod. B, Ex. VIII | 500 | 120 | 5 |
| Do.d | 5 | Prod. B, Ex. IX | 500 | 120 | 6 | a A commercial sodium grease containing approximately 10% of sodium soap.
b A lithium grease containing approximately 10% by weight of lithium stearate.
c A commercial barium base grease containing approximately 12.5% barium soap.
d A naphthenic SAE 20 lubricating oil of about 25 V.I.

The above description and examples of this invention are illustrative of the invention but are not to be con-

I claim:

1. A lubricant having antiwear characteristics consisting essentially of a mineral base lubricant containing between about 1% and about 10% by weight of an oil-soluble boron derivative obtained by reacting under dehydrating conditions 1 mol of a dihydroxy organic compound containing from about 6 to about 30 carbon atoms per molecule in which the hydroxyl groups are attached to carbon atoms separated by at least 1 carbon atom and by not more than 2 carbon atoms with an amount of a boron compound selected from the class consisting of boric acid and boron oxide equivalent to 1 mol of boric acid, and further reacting under dehydrating conditions the product so obtained with 1 mol of a monohydroxy organic compound having 1 to 26 carbon atoms per molecule.

2. A lubricant according to claim 1 in which said mineral base lubricant is a mineral lubricating oil.

3. A lubricant according to claim 1 in which said mineral base lubricant is a lubricating grease.

4. A lubricant having antiwear characteristics consisting essentially of a mineral base lubricant containing between about 2% and about 8% by weight of an oil-soluble boron derivative obtained by reacting under dehydrating conditions 1 mol of a dihydroxy organic compound containing from about 6 to about 18 carbon atoms per molecule in which the two hydroxyl groups are attached to carbon atoms separated by 1 carbon atom with an amount of a boron compound selected from the class consisting of boric acid and boron oxide equivalent to 1 mol of boric acid, and further reacting under dehydrating conditions the product so obtained with 1 mol of a monohydroxy organic compound having 1 to 20 carbon atoms per molecule.

5. A lubricant according to claim 4 in which said dehydrating conditions in each reacting step are obtained by refluxing a mixture of the reactants in a solvent boiling in the range of 180° F. to 400° F. and removing water as it is formed from the reflux stream.

6. A lubricant having antiwear characteristics consisting essentially of a mineral base lubricant containing between about 2% and about 8% by weight of an oil-soluble boron derivative obtained by reacting under dehydrating conditions 1 mol of an alkyl dihydroxy alcohol containing from about 6 to about 18 carbon atoms per molecule in which the two hydroxyl groups are attached to carbon atoms separated by 1 carbon atom with an amount of a boron compound selected from the class consisting of boric acid and boron oxide equivalent to 1 mol of boric acid, and further reacting under dehydrating conditions the product so obtained with 1 mol of a monohydroxy alkyl alcohol having 1 to 20 carbon atoms per molecule.

7. A lubricant having antiwear characteristics consisting essentially of a mineral base lubricant containing between about 2% and about 8% by weight of an oil-soluble boron derivative obtained by reacting under dehydrating conditions 1 mol of a dihydroxy compound selected from the class consisting of resorcinol and alkyl substituted resorcinols having less than about 18 carbon atoms per molecule with an amount of a boron compound selected from the class consisting of boric acid and boron oxide equivalent to 1 mol of boric acid, and further reacting under dehydrating conditions the product so obtained with 1 mol of a monohydroxy organic compound having 1 to 20 carbon atoms per molecule.

8. A lubricant having antiwear characteristics consisting essentially of a mineral base lubricant containing between about 1% and about 10% by weight of an oil-soluble boron derivative obtained by reacting under dehydrating conditions 1 mol of a dihydroxy organic compound containing from about 6 to about 30 carbon atoms per molecule in which the hydroxyl groups are attached to carbon atoms separated by at least 1 carbon atom and by not more than 2 carbon atoms and 1 mol of a monohydric organic compound having 1 to 20 carbon atoms per molecule with an amount of a boron compound selected from the class consisting of boric acid and boron oxide equivalent to 1 mol of boric acid.

9. A lubricant having antiwear characteristics consisting essentially of a mineral base lubricant containing between about 2% and about 8% by weight of an oil-soluble boron derivative obtained by reacting under dehydrating conditions 1 mol of an alkyl dihydroxy alcohol containing from about 6 to about 18 carbon atoms per molecule in which the two hydroxyl groups are attached to carbon atoms separated by 1 carbon atom and 1 mol of a monohydroxy alkyl alcohol having 1 to 20 carbon atoms per molecule with an amount of a boron compound selected from the class consisting of boric acid and boron oxide equivalent to 1 mol of boric acid.

10. A lubricating grease which comprises lubricating oil, a sufficient amount of soap to impart a grease consistency thereto, and between about 1% and about 10% of an additive prepared by reacting under dehydrating conditions 1 mol of a dihydroxy organic compound containing from about 6 to about 30 carbon atoms per molecule in which the hydroxyl groups are attached to carbon atoms separated by at least 1 carbon atom and by not more than 2 carbon atoms with an amount of a boron compound selected from the class consisting of boric acid and boron oxide equivalent to 1 mol of boric acid, and reacting the resulting product under dehydrating conditions with a monohydroxy organic compound having 1 to 26 carbon atoms per molecule, until approximately 1 mol of water is produced for each mol of monohydroxy organic compound reacted.

References Cited in the file of this patent

UNITED STATES PATENTS

| | | |
|---|---|---|
| 2,053,474 | Graves et al. | Sept. 8, 1936 |
| 2,160,917 | Shoemaker et al. | June 6, 1939 |
| 2,300,006 | Prescott et al. | Oct. 27, 1942 |
| 2,613,219 | Clark | Oct. 7, 1952 |
| 2,710,252 | Darling | June 7, 1955 |
| 2,721,181 | Lawrence et al. | Oct. 18, 1955 |
| 2,739,979 | Barnes et al. | Mar. 27, 1956 |
| 2,741,548 | Darling et al. | Apr. 10, 1956 |
| 2,795,548 | Thomas et al. | June 11, 1957 |
| 2,813,830 | Trautman | Nov. 19, 1957 |
| 2,872,479 | Letsinger et al. | Feb. 3, 1959 |